(12) United States Patent
Hiller et al.

(10) Patent No.: US 8,385,086 B2
(45) Date of Patent: Feb. 26, 2013

(54) CONVERTER HAVING A POLYPHASE MAINS-COMMUTATED POWER CONVERTER AND A LOAD-SIDE POWER CONVERTER

(75) Inventors: Marc Hiller, Lauf an der Pegnitz (DE); Rainer Sommer, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 270 days.

(21) Appl. No.: 12/866,617

(22) PCT Filed: Feb. 3, 2009

(86) PCT No.: PCT/EP2009/051201
§ 371 (c)(1),
(2), (4) Date: Aug. 6, 2010

(87) PCT Pub. No.: WO2009/098201
PCT Pub. Date: Aug. 13, 2009

(65) Prior Publication Data
US 2011/0002149 A1    Jan. 6, 2011

(30) Foreign Application Priority Data
Feb. 6, 2008 (DE) .................. 10 2008 007 659

(51) Int. Cl.
*H02M 3/335* (2006.01)
(52) U.S. Cl. .............. 363/17; 363/95; 363/98; 363/131; 363/132; 363/135; 363/136
(58) Field of Classification Search .................... 363/17, 363/98, 95, 131, 132, 135, 136
See application file for complete search history.

(56) References Cited

U.S. PATENT DOCUMENTS

| 5,343,139 A | * | 8/1994 | Gyugyi et al. | 323/207 |
| 5,459,655 A | * | 10/1995 | Mori et al. | 363/132 |
| 5,642,275 A | * | 6/1997 | Peng et al. | 363/137 |

(Continued)

FOREIGN PATENT DOCUMENTS

| DE | 10103031 A1 | 7/2002 |
| DE | 102005041087 A1 | 3/2007 |

(Continued)

OTHER PUBLICATIONS

Marquardt et al., "Modulares Stromrichterkonzept fuer Netzkupplungsanwendungen bei hohen Spannungen" ETG—Tagung 2002—Statement of Relevance.

(Continued)

*Primary Examiner* — Bao Q Vu
(74) *Attorney, Agent, or Firm* — Laurence A. Greenberg; Werner H. Stemer; Ralph E. Locher

(57) ABSTRACT

A converter has a network-side and a load-side power converter that are connected together on the DC side in an electrically conductive manner. An upper and a lower valve branch of each phase module, respectively, of the load-side power converter has at least one two-poled subsystem. At least one multiphase network-controlled power converter is provided as the network-side power converter. In this way, a converter is obtained, in particular an intermediate voltage circuit converter for intermediate voltages, which combines a simple and cost-effective feed circuit on the network side with a modular multilevel converter on the load side.

10 Claims, 5 Drawing Sheets

U.S. PATENT DOCUMENTS

| | | | |
|---|---|---|---|
| 5,731,970 A * | 3/1998 | Mori et al. | 363/132 |
| 5,889,668 A * | 3/1999 | Schauder et al. | 363/137 |
| 5,946,178 A * | 8/1999 | Bijlenga | 361/91.5 |
| 6,259,616 B1 * | 7/2001 | Ekwall et al. | 363/132 |
| 6,480,403 B1 * | 11/2002 | Bijlenga | 363/98 |
| 6,519,169 B1 * | 2/2003 | Asplund et al. | 363/132 |
| 6,898,095 B2 * | 5/2005 | Bijlenga et al. | 363/132 |
| 7,050,311 B2 * | 5/2006 | Lai et al. | 363/37 |
| 7,269,037 B2 * | 9/2007 | Marquardt | 363/71 |
| 7,577,008 B2 * | 8/2009 | Hiller | 363/132 |
| 7,835,166 B2 * | 11/2010 | Hiller | 363/132 |
| 8,138,632 B2 * | 3/2012 | Sommer et al. | 307/87 |
| 2008/0205093 A1 | 8/2008 | Davies et al. | |

FOREIGN PATENT DOCUMENTS

WO 2007028349 A1 3/2007

OTHER PUBLICATIONS

Beuermann et al., "Stromrichterschaltung fuer Mittelspannung und deren Leistungshalbleiter fuer den Einsatz in Industriestromrichtern", Siemens AG, Germany, ETG—Tagung 2006—Statement of Relevance.

Heumann et al., "THYRISTOREN Eigenschaften und Anwendungen", 1974, B.G. Teubner Stuttgart—Statement of Relevance.

Maswood a. I. et al.: "Near Unity Input Displacement Factor for Voltage Source PWM Drives", 2001 IEEE power engineering society winter meeting. Conference proceedings. Columbus OH, Jan. 28-Feb. 1, 2001: [IEEE power engineering society winter meeting], New York, NY: IEEE, US, pp. 1388-1392, xp001042882.

Hagiwara M. et al.: "A 21-Level (Line-to-Line) BTB System Based on Series Connection of Sixteen Converter-Cells for Power Flow Control: Experimental Verifications by a 200-V, 10-kW Laboratory System", Industry Applications Conference, 2004, 39th IAS annual meeting. Conference record of the 2004 IEEE Seattle, WA, USA, Oct. 3-7, 2004, pp. 1432-1438, XP010735292.

Van Der Pols, et al.: "Design and Implementation of a Single-Board Motor Supply Controller", EPE 1997, 7th European Conference on Power Electronics and Applications. Trondheim, Sep. 8-10, 1997: [EPE European Conference on Power Electronics and Applications], Brussels, EPE Association, vol. Conf. 7, pp. 2.543-2.548, XP000792339.

* cited by examiner

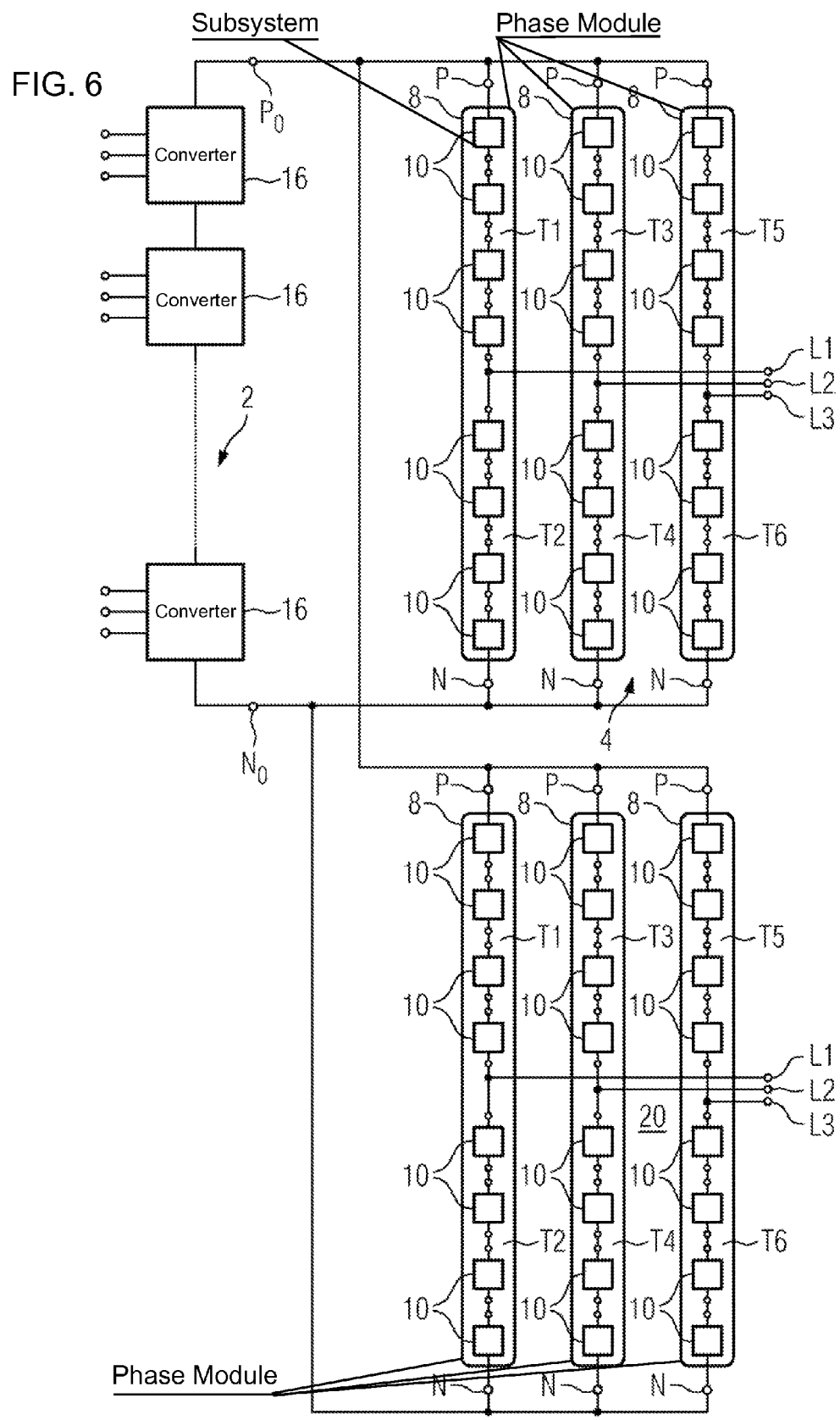

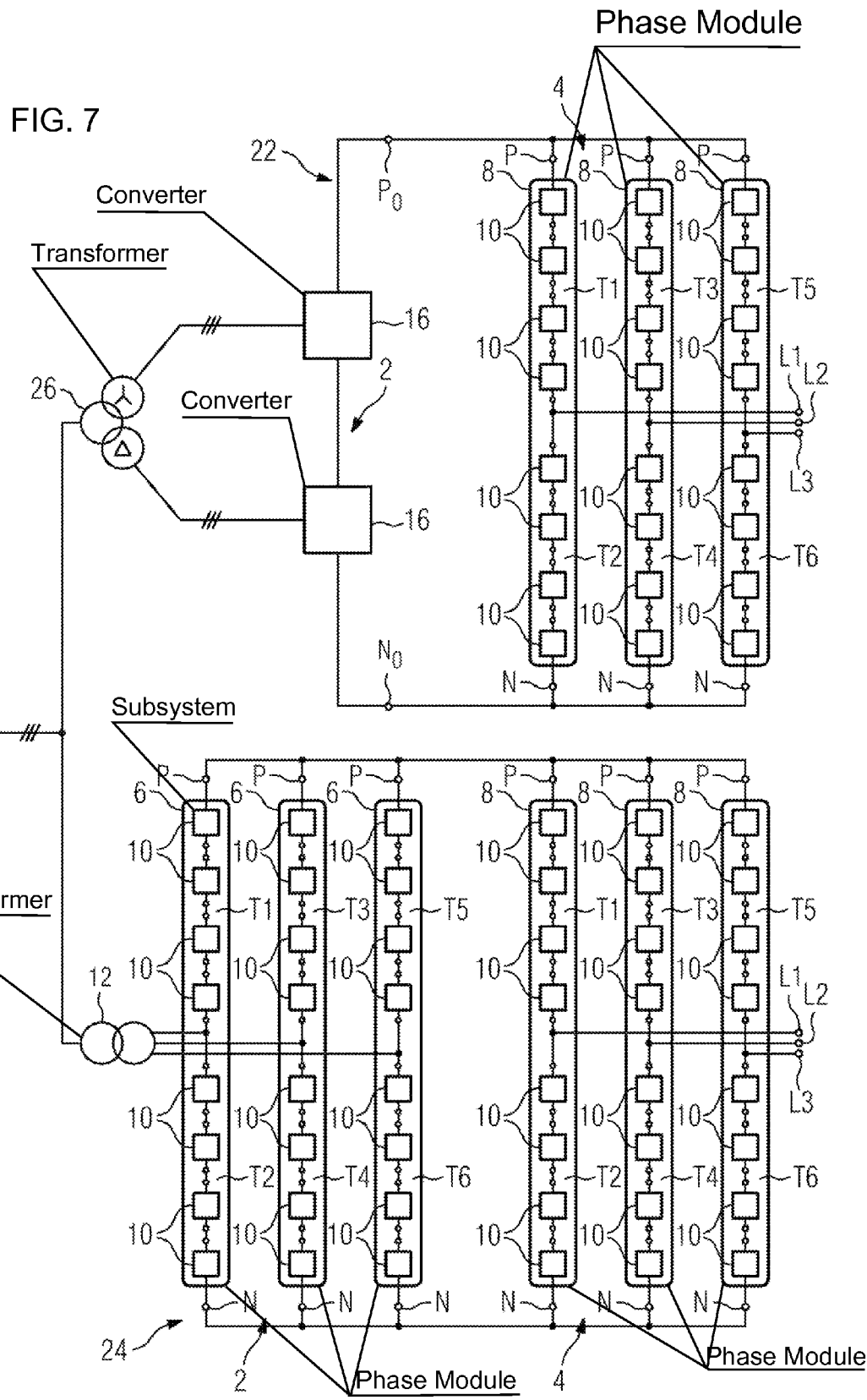

CONVERTER HAVING A POLYPHASE MAINS-COMMUTATED POWER CONVERTER AND A LOAD-SIDE POWER CONVERTER

BACKGROUND OF THE INVENTION

Field of the Invention

The invention relates to a converter having a mains-side power converter and a load-side power converter, which are electrically conductively connected to one another on the DC voltage side. A respective upper and lower valve branch of each phase module of the load-side polyphase power converter has at least one two-pole subsystem.

A multiplicity of different circuit topologies and power semiconductors are used in drive technology, in particular for medium voltage. The circuit topologies which are normally used in medium-voltage industrial power converters can be subdivided roughly into three circuit categories, specifically into voltage intermediate-circuit converters, current intermediate-circuit converters and direct converters using thyristor technology. In addition, voltage intermediate-circuit converters can be subdivided into two sub-categories, specifically into delta-connected converters and star-connected converters. Typical representatives of delta-connected converters are, for example, 3-level neutral-point clamped converters (3L-NPC) with a 12-pulse diode feed and a 4-level flying capacitor converter (4L-FC) with a 12-pulse diode feed. Typical representatives of star-connected voltage intermediate-circuit converters are, for example, a series-connected H-bridge cell converter with 2-level H-bridges per cell (SC-HB (2L)) and a series-connected H-bridge cell converter with a 3-level H-bridge per cell (SC-HB (3L)). Delta connection has the characteristic that the voltage load on the semiconductor circuit is higher than that of a star-connected power converter with the same output voltage, while the current load is at the same time reduced. Because of their modularity, converters using SC-HB topology make it possible to use low-blocking-capacity semiconductor switches, with a reduced number of cells, even in the medium-voltage range.

Equivalent circuits of the abovementioned converter topologies for medium voltage are disclosed in the publication entitled "Stromrichterschaltungen für Mittelspannung und deren Leistungshalbleiter für den Einsatz in Industriestromrichtern", [Power converter circuits for medium voltage and their power semiconductors for use in industrial power converters], by Max Beuermann, Marc Hiller and Dr. Rainer Sommer, printed in the Proceedings of the ETG Conference "Bauelemente der Leistungselektronik und ihre Anwendung" [Power electronics components and their use], Bad Nauheim 2006.

The publication "Modulares Stromrichterkonzept für Netzkupplungsanwendung bei hohen Spannungen" [Modular power converter concept for mains-coupling application at high voltages] by Rainer Marquardt, Anton Lesnicar and Jürgen Hildinger, printed in the Proceedings of the ETG Conference 2002, discloses a converter having a mains-side power converter and a load-side power converter, which are electrically conductively connected to one another on the DC voltage side, using a modular multipoint power converter, also referred to as a modular multilevel power converter (M2C), as the power converter in each case. A voltage intermediate-circuit converter such as this with a mains-side power converter and a load-side power converter using M2C topology no longer has a voltage intermediate circuit formed from intermediate-circuit capacitors, in contrast to the already described voltage intermediate-circuit converters. Each valve branch of each phase module of the converter using M2C topology has at least one two-pole subsystem. The number of steps in a phase output voltage is governed by the number of subsystems used in each valve branch.

BRIEF SUMMARY OF THE INVENTION

The invention is now based on the object of specifying a voltage intermediate-circuit converter having a load-side power converter using M2C topology, which is simpler and costs less.

According to the invention, this object is achieved in that at least one polyphase mains-commutated power converter is provided as the mains-side power converter.

Since at least one polyphase, mains-commutated power converter is provided as the mains-side power converter, this results in a voltage intermediate-circuit converter having a load-side power converter using M2C topology, which has a simple and low-cost feed circuit. In comparison to known voltage intermediate-circuit converters, the converter according to the invention no longer has an intermediate-circuit capacitor in the voltage intermediate circuit. Because the intermediate circuit does not need to be designed to have a low inductance, and because there is no intermediate-circuit capacitor, a short in the intermediate circuit is much less probable than in the case of conventional converters. In consequence, the entire converter, in particular the power converter valves in the mains-side, mains-commutated power converter, no longer need be designed for a short-circuit current caused by a low-impedance short in the intermediate circuit. Furthermore, the $i^2t$ requirement for the power converter valves in the mains-side, mains-commutated power converter in the converter according to the invention can be reduced considerably in comparison to that of a known voltage intermediate-circuit converter with a diode feed and an intermediate-circuit capacitor.

In one advantageous embodiment of the converter according to the invention, a polyphase diode rectifier is provided as the polyphase mains-commutated power converter. This results in a particularly simple and low-cost feed.

In a further advantageous embodiment of the converter according to the invention, a polyphase thyristor rectifier or a half-controlled bridge is provided as the polyphase, mains-commutated power converter. The module capacitors in the load-side power converter using M2C topology are therefore charged by increasing the DC voltage by means of the mains-side thyristor rectifier. This means there is no need for a precharging circuit, as is necessary for a diode feed. Furthermore, in the starting range of a load which is fed from the load-side power converter using M2C topology, this power converter can be operated with low output voltages in the full-drive range. In the case of a power converter using M2C topology, the energy content, that is to say the mean voltage of the module capacitors in the two-pole subsystems of this power converter using M2C topology, can be regulated independently of the intermediate-circuit voltage and independently of the form of feed circuit.

In a further advantageous embodiment of the converter according to the invention, a polyphase thyristor reversible power converter is provided as the polyphase, mains-commutated power converter. In comparison to the embodiment with a polyphase thyristor rectifier, this allows energy to be fed back into a feeding network from a load.

The invention will be explained further with reference to the drawing, which schematically illustrates a plurality of embodiments of a converter according to the invention, and in which:

DESCRIPTION OF THE INVENTION

Figure 1:
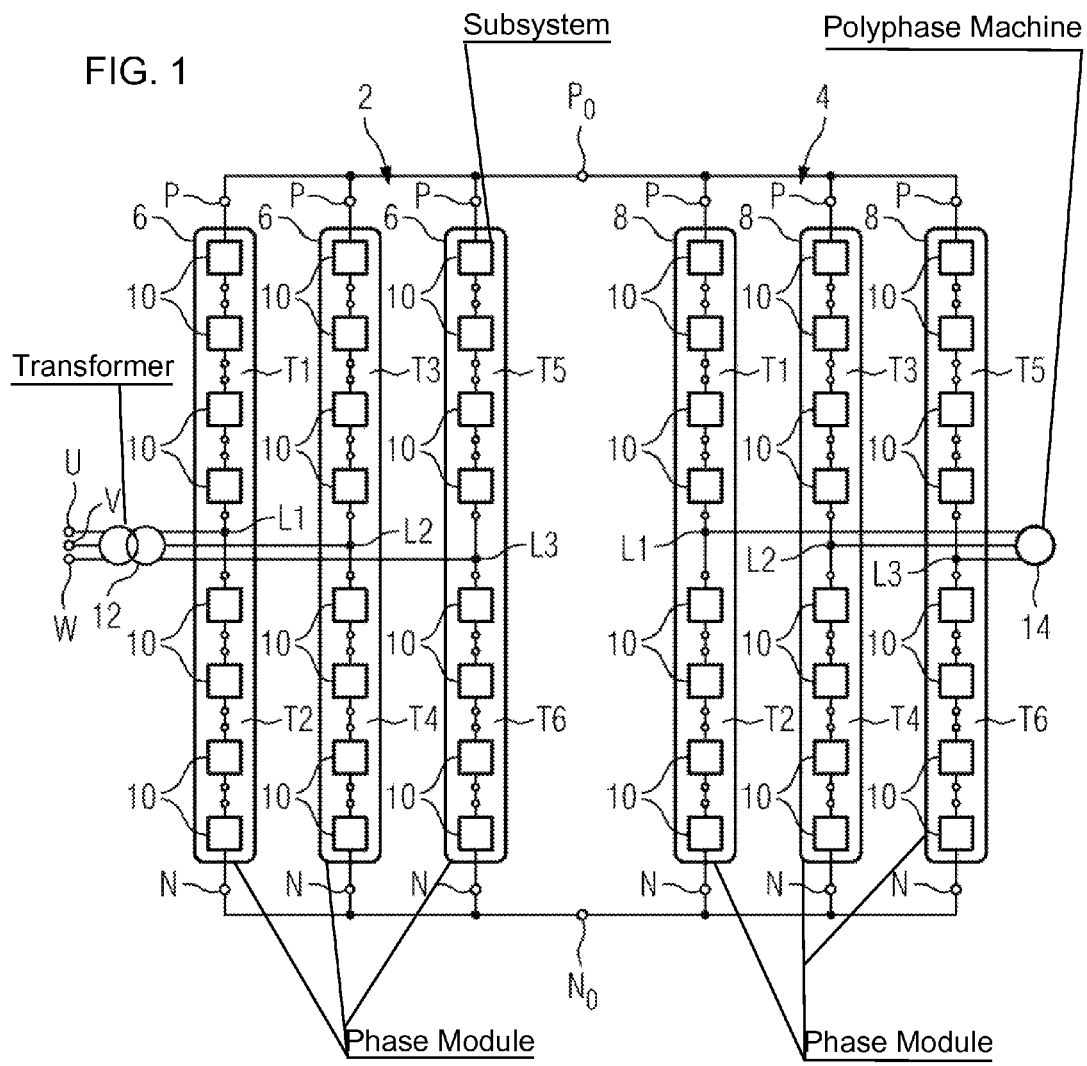
FIG. 1 shows a circuit diagram of a known converter with a ains-side power converter and a load-side power converter, each using M2C topology.

FIG. 1 shows a circuit diagram of a converter, in particular of a voltage intermediate-circuit converter, having a mains-side power converter 2 and a load-side power converter 4, which are each in the form of M2C power converters. One such converter is known from the already cited publication from the ETG Conference 2002. In the illustrated embodiment, the two power converters 2 and 4 in the converter are three-phase power converters. The power converters 2 and 4 therefore each have three phase modules 6 and 8, respectively, which are electrically conductively connected on the DC voltage side to a positive DC voltage busbar $P_0$ and to a negative DC voltage busbar $N_0$. A DC voltage, which is not referred to in any more detail, is dropped between these DC voltage busbars $P_0$ and $N_0$. Each phase module 6 and 8 of the respective mains-side power converter 2 and load-side power converter 4 has an upper and a lower valve branch T1, T3, T5 and T2, T4, T6. Each of these valve branches T1-T6 has a number of two-pole subsystems 10, which are electrically connected in series. In the illustrated circuit diagram, each valve branch T1-T6 has four two-pole subsystems 10. Exemplary embodiments of these two-pole subsystems 10 are described in more detail, and their methods of operation are explained, in DE 101 03 031 A1 and in DE 10 2005 041 087 A1. Each connecting point between the two respective power converter valves T1 and T2 as well as and as well as T5 and T6 of a phase module 10 in the mains-side power converter 2 and load-side power converter 4 form a respective AC-voltage-side connection L1, L2 or L3. A secondary winding of a mains transformer 12 is connected to the AC-voltage-side connections L1, L2 and L3 of the mains-side power converter 2, and the primary winding of this mains transformer 12 is connected to a feeding polyphase mains system, which is not illustrated in any more detail. A load, in particular a polyphase machine 14, is connected to the AC-voltage-side connections L1, L2 and L3 of the load-side power converter 4.

Figure 2:
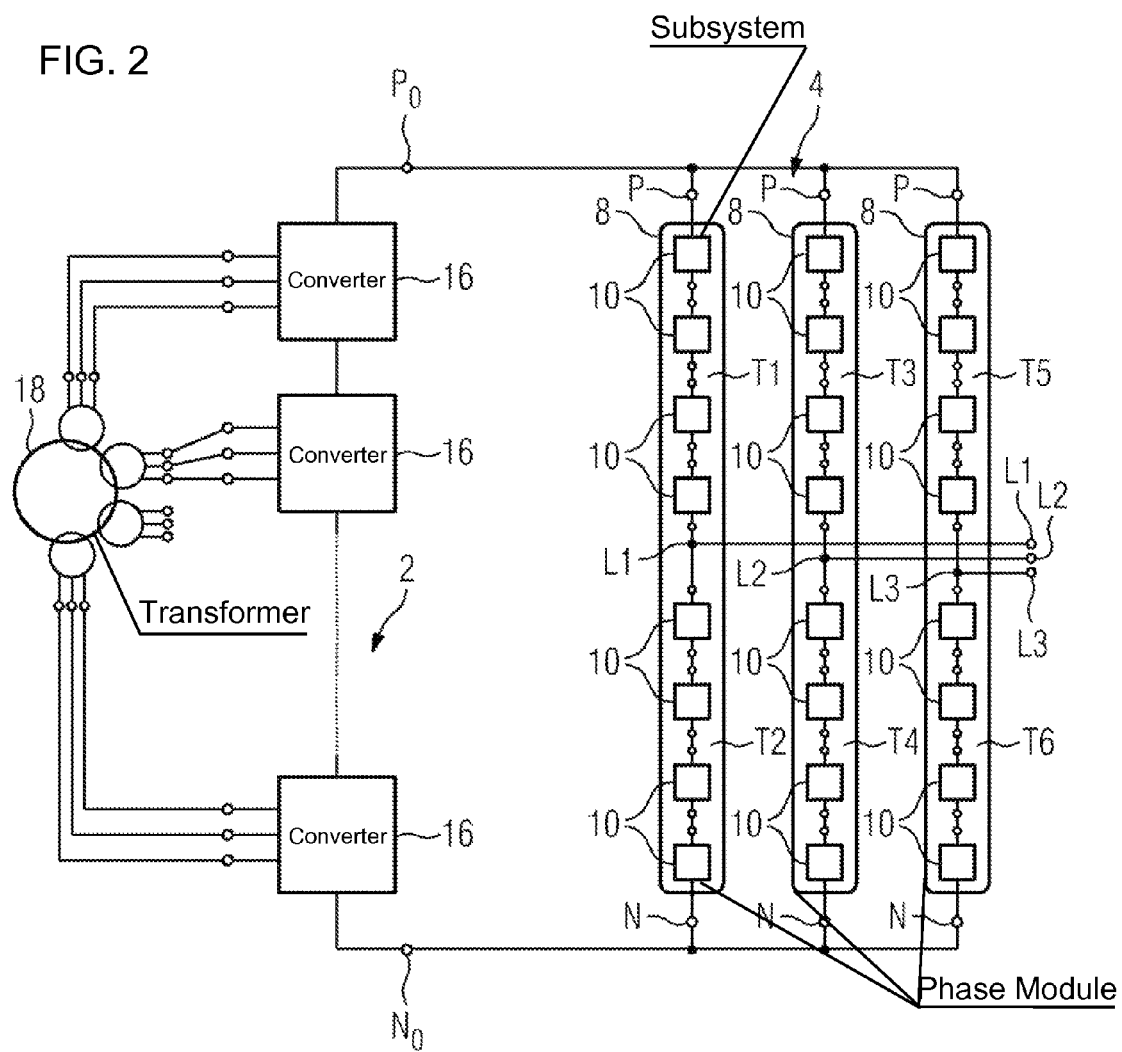
FIG. 2 shows a circuit diagram of a converter according to the invention.

FIG. 2 shows an outline circuit diagram of a converter, in particular of a voltage intermediate-circuit converter, according to the invention. This converter according to the invention differs from the known converter shown in FIG. 1 by providing a plurality of polyphase mains-commutated power converters 16, connected electrically in series on the DC voltage side, as the mains-side power converter 2. The mains-commutated power converters 16 can also be connected in parallel or in series and parallel on the DC voltage side. In addition, just one polyphase mains-commutated power converter 16 can be provided as the feed circuit. A mains transformer 18 is provided on the AC voltage side, and has secondary windings, corresponding to the number of mains-commutated power converters 16. These secondary windings preferably each have a predetermined shift angle with respect to one another. The magnitude of these shift angles depends on the number of mains-commutated power converters 16 connected electrically in series on the DC voltage side.

Figure 3:
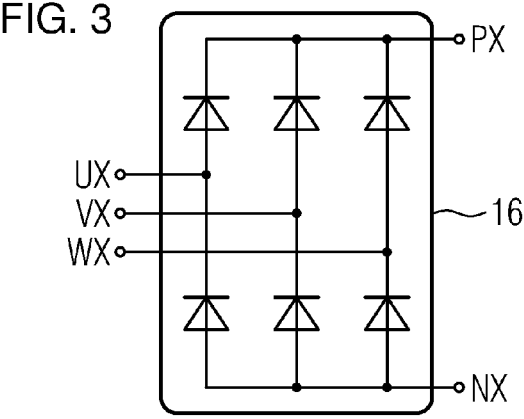
FIG. 3 shows a circuit diagram of a 6-pulse diode bridge.

FIG. 3 schematically illustrates a first embodiment of a mains-commutated power converter 16, which in this case is in the form of a 6-pulse diode bridge circuit. When two of these 6-pulse diode bridge circuits are connected electrically in series on the DC voltage side, then this results in a 12-pulse mains-side power converter 2. The two 6-pulse diode bridge circuits are connected to a feeding mains system by means of a standard transformer, consisting of a delta-connected secondary winding and a star-connected secondary winding. When three 6-pulse diode-bridge circuits are connected in series on the DC voltage side, then this results in an 18-pulse circuit for the mains-side power converter 2. The greater the number of pulses of this mains-side power converter 2, the lesser the harmonic load on the feeding mains system. For this low mains-system load to occur, the mains voltages ux, vx and wx on the AC voltage side of in each case one of the two 6-pulse diode bridges must have a shift angle between them (for example of 30° electrical for a 12-pulse circuit). This is achieved, for example, by connecting one of the two secondary windings in delta, and the other in star.

Figure 4:
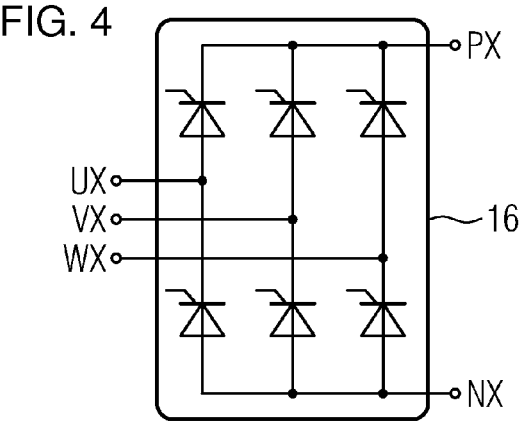
FIG. 4 shows a circuit diagram of a 6-pulse thyristor bridge.

FIG. 4 illustrates a second embodiment of a mains-commutated power converter 16 in more detail. This embodiment is a thyristor rectifier with a 6-pulse bridge circuit. This embodiment of the mains-commutated power converter 16 allows the intermediate-circuit DC voltage to be set to a predetermined value independently of the mains voltage of a feeding mains system. It is also possible to charge the module capacitors in the two-pole subsystems 10, which means that there is no longer any need for a separate precharging circuit. This also applies to a half-controlled thyristor bridge.

Figure 5:
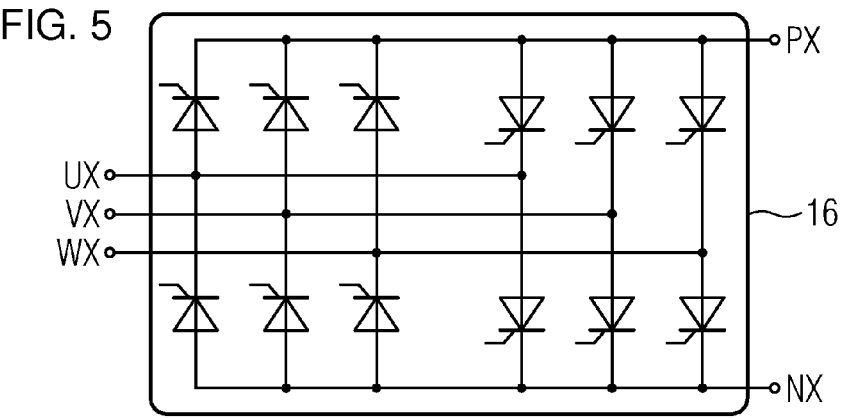
FIG. 5 shows a circuit diagram of a 6-pulse thyristor reversible power converter, and FIGS. 6 and 7 each show a circuit diagram of one further embodiment of a converter according to the invention.

If it is intended to feed energy back from the load 14 into a feeding mains system, then a thyristor reversible power converter as shown in FIG. 5 is used as the mains-commutated power converter 16, rather than a 6-pulse diode bridge as shown in FIG. 3 or a 6-pulse thyristor bridge as shown in FIG. 4.

FIG. 6 shows a circuit diagram of a further embodiment of the converter according to the invention. This embodiment differs from the embodiment shown in FIG. 2 by the provision of a further load-side power converter 20 using M2C topology. This further load-side power converter 20 is likewise in the form of a three-phase M2C power converter, in the same way as the first load-side power converter 4. On the DC voltage side, this further mains-side power converter 20 is electrically conductively connected to the positive DC voltage busbar $P_0$ and to the negative DC voltage busbar $N_0$ of the converter. A converter such as this with two load-side power converters 4 and 20 and a mains-side power converter 2, which comprises at least two mains-commutated power converters 16 connected electrically in series, allows two loads 14 to be controlled separately from one another, at the same time. Since this voltage intermediate-circuit power converter no longer has a central intermediate-circuit capacitor, it is not subject to any particular requirements relating to low-inductance design of the converter. In addition, this exploits the installed power converter design power of the mains-side power converter 2, which has at least two mains-commutated power converters 16 which are electrically connected in series on the DC voltage side.

FIG. 7 shows a circuit diagram of a further embodiment of the converter according to the invention. This embodiment differs from the embodiment shown in FIG. 2 by a converter unit 22 and a converter unit 24 being combined with one another. The converter unit 22 corresponds to the converter shown in FIG. 2, with the mains-side power converter 2 having only two mains-commutated power converters 16, which are electrically connected in series on the DC voltage side. A mains transformer 26 correspondingly has only two secondary windings. One of these two secondary windings is connected in star, while in contrast the other secondary winding is connected in delta. This results in a 12-pulse feed circuit. The converter unit 24 corresponds to the converter shown in FIG. 1. These two converter units 22 and 24 are operated in parallel. In this case, the converter unit 24 can be operated such that it can compensate for the harmonic currents of the mains-side power converter 2 of the converter unit 22, and its reactive power.

The combination of a mains-side power converter 2, which has at least two mains-commutated power converters 16 connected electrically in series on the DC voltage side, with a load-side power converter 4, which is in the form of a modular multilevel power converter (M2C), results in a voltage intermediate-circuit converter which no longer has a voltage intermediate circuit formed from at least one capacitor, in comparison to the known embodiments of a voltage intermediate-circuit converter for medium voltage in the sub-category "delta-connected converters". In comparison to known voltage intermediate-circuit converters for medium voltage in the sub-category "star-connected converters", two-pole subsystems 10 are now used instead of H-bridges for cell converters, in which case low-blocking-capacity semiconductor switches, in particular IGBTs with a blocking voltage of 1.7 kV, are likewise used in the medium-voltage range. This results in a voltage intermediate-circuit converter for medium voltage which combines a simple diode feed with a standard transformer 26 for power converter applications and an intermediate circuit, which does not necessarily need to have a low inductance, without an energy store, with a load-side cell converter of reduced complexity, thus resulting simply in the advantages of the known converters connected in delta and connected in star.

The invention claimed is:

1. A converter, comprising:
   a mains-side power converter having a DC voltage side; and
   a load-side polyphase power converter having a DC voltage side electrically conductively connected to said DC voltage side of said mains-side power converter;
   each phase module of said load-side polyphase power converter having a respective upper and lower valve branch with at least one two-pole subsystem;
   said mains-side power converter having at least one polyphase mains-commutated power converter.

2. The converter according to claim 1, wherein said mains-commutated power converter is a diode rectifier.

3. The converter according to claim 1, wherein said mains-commutated power converter is a thyristor rectifier.

4. The converter according to claim 1, wherein said mains-commutated power converter is a half-controlled thyristor bridge.

5. The converter according to claim 1, wherein said mains-commutated power converter is a thyristor reversible power converter.

6. The converter according to claim 4, wherein a diode rectifier and a thyristor rectifier are provided as half-controlled bridges and are connected electrically in series on the DC voltage side.

7. The converter according to claim 1, which comprises a further load-side polyphase power converter connected on a DC voltage side electrically in parallel with said mains-side and a first said load-side polyphase power converter.

8. The converter according to claim 1, wherein said at least one polyphase mains-commutated power converter is one of at least two polyphase mains-commutated power converters electrically connected in series, wherein said at least two polyphase mains-commutated power converters in said mains-side power converter are each linked on an AC voltage side to connections of a low-voltage-side transformer winding of a mains transformer.

9. The converter according to claim 8, wherein said low-voltage-side transformer windings are configured to have a predetermined phase shift angle with respect to one another.

10. The converter according to claim 1, wherein said mains-side power converter is a modular multilevel power converter and said load-side polyphase power converter is a modular multilevel power converter.

* * * * *